United States Patent [19]

Takata et al.

[11] Patent Number: 4,969,100
[45] Date of Patent: Nov. 6, 1990

[54] WHEEL REFERENCE VELOCITY CALCULATION APPARATUS

[75] Inventors: Koji Takata; Tatuji Matumoto, both of Itami, Japan

[73] Assignee: Sumitomo Electric Industries, Ltd., Osaka, Japan

[21] Appl. No.: 291,650

[22] Filed: Dec. 29, 1988

[30] Foreign Application Priority Data

Dec. 29, 1987 [JP] Japan .................. 62-334038

[51] Int. Cl.⁵ .................................. G01P 3/04
[52] U.S. Cl. ..................... 364/426.02; 364/565
[58] Field of Search ........... 364/565, 426.02, 424.01, 364/426.04; 303/95; 180/197

[56] References Cited

U.S. PATENT DOCUMENTS

| 3,260,555 | 7/1966 | Packer | 303/96 |
| 3,744,849 | 7/1983 | Jonason et al. | 303/109 |
| 3,811,739 | 5/1974 | Nakamura et al. | 303/109 |
| 4,053,188 | 10/1977 | Jonner | 303/96 |
| 4,777,611 | 12/1988 | Tashiro et al. | 364/565 |
| 4,799,178 | 1/1989 | Spadafora et al. | 364/565 |
| 4,811,232 | 3/1989 | Hoashi et al. | 364/426.02 |
| 4,839,834 | 6/1989 | Omae et al. | 364/565 |

FOREIGN PATENT DOCUMENTS

| 2644258 | 7/1987 | Fed. Rep. of Germany . |
| 3720172 | 12/1987 | Fed. Rep. of Germany . |
| 2092605 | 1/1972 | France . |
| 2194597 | 3/1974 | France . |
| 2066477 | 7/1981 | United Kingdom . |
| 2151320 | 7/1985 | United Kingdom . |

OTHER PUBLICATIONS

Patent Abstracts of Japan, vol. 9, No. 183 (M-400) (1906) Jul. 30, 1985 and JP-A-6050061 (Toyota Jidosha K.K.), Mar. 19, 1985-the whole document.

Primary Examiner—Thomas G. Black
Attorney, Agent, or Firm—Cushman, Darby & Cushman

[57] ABSTRACT

A reference wheel velocity calculation apparatus for use in an automotive vehicle includes a device for sampling actual wheel velocities detected at a predetermined sampling cycle, a device to select a suitable velocity as the basis of the calculation of reference wheel velocity, and a calculator for calculating an intermediate reference velocity of the present sampling point from the selected wheel velocity by suppressing the variance of intermediate reference velocity within predetermined limit(s). Further, a greater one of the presently sampled selected wheel velocity and a calculated intermediate reference velocity is selected as a quasi-reference wheel velocity which is then smoothed according to index to obtain the reference wheel velocity. The limit of the variance may be changed in regard to the accelerometer provided in the vehicle. Also, the smoothing index may be changed with respect to the factors such as the behavior of the wheel velocity.

21 Claims, 4 Drawing Sheets

WHEEL REFERENCE VELOCITY CALCULATION APPARATUS

BACKGROUND OF THE INVENTION

1. Field of the Invention

The present invention relates to a reference wheel velocity calculation apparatus which calculates the wheel velocity (hereinafter referred to as "reference wheel velocity") used as the control reference in an apparatus for electronically controlling vehicle movement with an optimized slip characteristic.

2. Description of the Prior Art

When an automotive vehicle is running on a dry asphalt surface in a stable condition, the wheels of the vehicle rotate at a speed slightly faster than the vehicle speed, with an optimized amount of spinning. In this case, the wheel velocity itself may be defined as the reference wheel velocity. The reference wheel velocity may also be defined as the vehicle speed, the wheel velocity at which there is absolutely no slipping or spinning.

When driving on an icy surface or other poor road, the measured wheel velocity tends to be lower than the reference wheel velocity when the brakes are applied because there is a tendency for the brakes to lock the wheels, or be higher than the reference wheel velocity during starting or acceleration of the vehicle because the wheels spin. To control the wheels, it is first necessary to know the reference wheel velocity. The obtained reference wheel velocity may then be used, for example, in an antilock control system.

For example, in a vehicle equipped with an antilock control system, wheel slipping and the slip rate are obtained from the reference wheel velocity and the measured wheel velocity, and when slipping becomes excessive, the braking force is relieved and the wheel speed is again increased in order to maintain optimum wheel slipping. Though accurate values may be obtained if the vehicle speed is measured with, for example, a spatial filter and the reference wheel velocity is calculated from thus measured vehicle speed, the required apparatus would be bulky and expensive, and is therefore not practical. In general, the estimated vehicle speed or reference wheel velocity is calculated (actually estimated) from a measured wheel speed.

In a method used in vehicles equipped with an antilock control system, the velocity of each wheel is measured at each control cycle dT, and the maximum among each wheel velocity can be defined as the reference wheel velocity.

However, according to this method, the reference wheel velocity is estimated to be unduly low when all four wheels show a tendency to lock.

Apparatuses which have improved upon this problem include that described in U.S. Pat. No. 3,260,555. According to this device, when the deceleration of the highest wheel velocity is greater than a specified deceleration, the wheels are assumed to be in the process of lock, and the reference wheel velocity is calculated by substituting the the maximum assumed deceleration possible for the vehicle for deceleration of the highest wheel velocity.

In another proposed prior art method (U.S. Pats. No. 3,811,739 and 4,053,188), the reference wheel velocity is set as a value normally unequal to the maximum wheel velocity, and the increase (acceleration) or decrease (deceleration) in the reference wheel velocity is determined from the amount of the difference between the reference and maximum wheel velocity.

In yet another proposed prior art method (U.S. Pat. No. 3,401,984), vehicle deceleration is measured and integrated to define the reference wheel velocity, and in another (U.S. Pat. No. 3,744,849) this integrated value is repeatedly compared and updated with the maximum wheel velocity to remove accumulated error.

While some of the previously disclosed devices according to the prior art, such as U.S. Pat. No. 4,053,188, show applicable concepts, none of the disclosed apparatuses alone are yet able to provide a reference wheel velocity sufficiently smooth and reliable for antilock-controlled wheels on various types of road surfaces including dry asphalt, ice, and other poor roads.

Particularly in four-wheel drive vehicles, which have recently become widely used, the difference between the maximum wheel velocity and the desired reference wheel velocity can more easilY become excessive due to the small difference in the wheel velocities of the four wheels.

SUMMARY OF THE INVENTION

The present invention has been developed with a view to substantially solve the above described disadvantages and has for its essential object to provide an improved reference wheel velocity calculation apparatus with a high accuracy and with a simple structure.

In accomplishing these and other objects, a reference wheel velocity calculation apparatus according to the present invention comprises a means for selecting a suitable wheel velocity as the basis of calculating reference wheel velocity, e means for obtaining an intermediate reference velocity using selected wheel velocitY, but suppressing the change of the intermediate velocity in an unit time within an allowable limit if the change exceeds the limit, a means for obtaining the reference velocity converging the intermediate reference velocity with a selected convergence rate, and a means for deciding the convergence rate in accordance with the behavior of the selected wheel.

It is desirable that the value of the limits used to obtain the intermediate reference velocity be variable according to the vehicle accelerometer.

In summary, a preferred embodiment according to the present invention is designed so that reference wheel velocity Vr traces the upper side of the envelope of the variance of selected wheel velocity Vm. Furthermore, as envelope can often be significantly lower than the vehicle speed on ice and other road surfaces with an extremely low coefficient of friction ($\mu$), reference wheel velocity Vr must be set apart from the envelope and closer to the actual (but not measured) vehicle speed in such circumstances. Such circumstances can be overcome if reference wheel velocity Vr is maintained at a good level, some hundred milliseconds longer, but if reference wheel velocity Vr tracks and immediately decreases with Vm, it may be difficult to overcome the circumstances. On the other hand, the reference wheel velocity Vr should follow the upper envelope of Vm relatively quickly on road surfaces with a high coefficient of friction ($\mu$).

Therefore, the present invention is so constructed as to output intermediate reference velocity Vi of which the variance of velocity in an unit time is limited to a specified amount Dv, and tr output reference wheel velocity Vr adaptable to various road surfaces through appropriately delaying and smoothing said intermediate reference velocity Vi.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DETAILED DESCRIPTION OF THE PREFERRED EMBODIMENTS

Before the description of a preferred embodiment of the present invention proceeds, it is to be noted that the reference wheel velocity calculation apparatus according to the embodiment described herein is constructed in combination with an antilock control system as controlled by a circuit 11. However, the principle of the reference wheel velocity calculation apparatus according to the present invention can be used in other systems, such as a traction control system.

Figure 1:
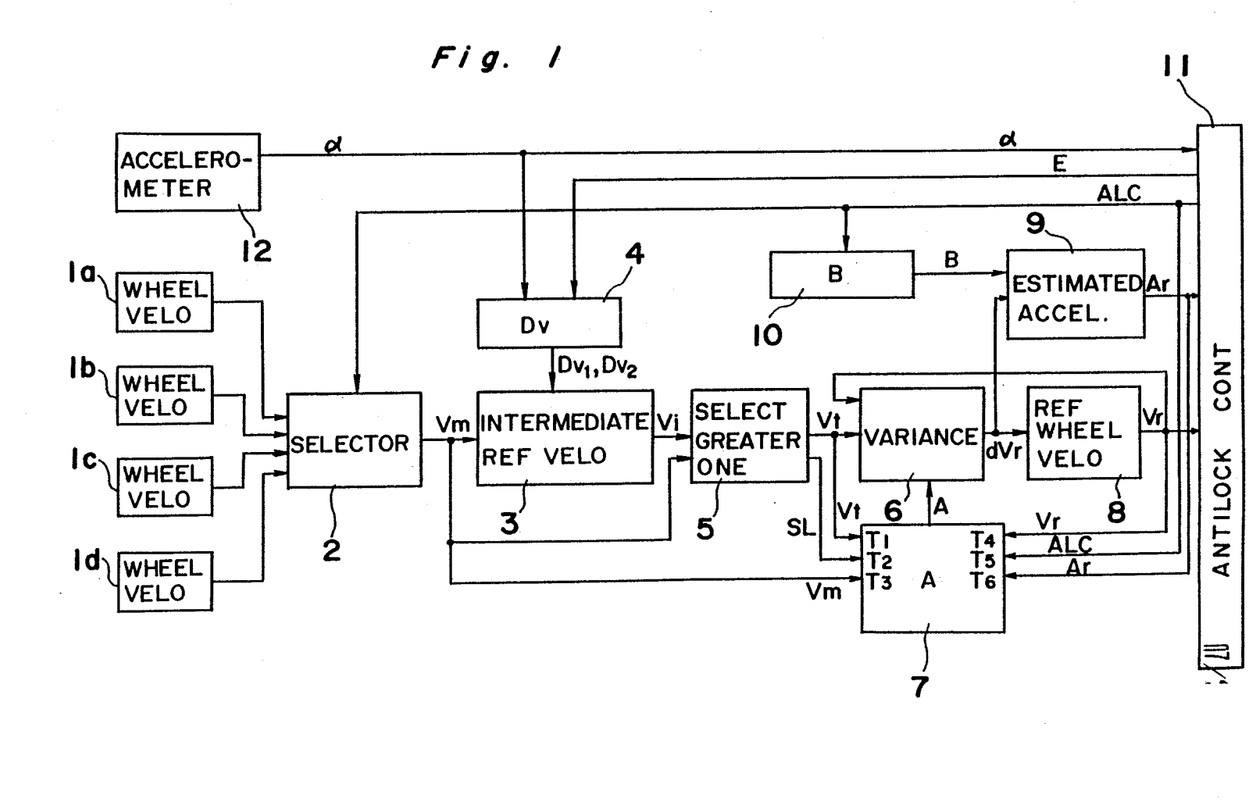
FIG. 1 is a block diagram of a reference wheel velocity calculation apparatus according to the present invention.

Referring to FIG. 1, reference numbers 1a, 1b, 1c, and 1d are each wheel velocity detectors which detect the actual rotational velocity of respective wheels.

Reference number 2 is a selector which simultaneously samples the wheel velocity of the four wheels coming from wheel velocity detectors 1a, 1b, 1c, and 1d, and selects a selected wheel velocity and outputs it as Vm in each sampling cycle. In a two-wheel drive vehicle, for example, selector 2 selects the maximum wheel velocity of the four wheels during the antilock control is being effected, and the faster one of the two non-driven wheels during the antilock control is not being effected. After each sampling interval Td (for example, 0.01 second), the selected wheel velocity Vm is renewed, as shown by a bold line in the graph of FIG. 2 in which plotted points M1, M2, ... represent the selected wheel velocity Vm.

The faster one of the two non-driven wheels may be selected even during the antilock control if the driving of the driven wheel can be detected.

Reference number 3 is a device which sets an intermediate reference velocity Vi. Intermediate reference velocity Vi setting device 3 determines whether the selected wheel velocity $Vm_i$ obtained during the current sampling cycle is within specified limit of variance Dv from intermediate reference velocity $Vi_{i-1}$ obtained during the previous sampling cycle, specifically whether:

$$Vi_{i-1}+Dv_1 < Vm_i < Vi_{i-1}+Dv_2. \quad (1)$$

provided $$\tfrac{1}{2}(Dv_1+Dv_2)=\alpha*dt \quad (1')$$

wherein $Dv_1$ is a lower side Dv, $Dv_2$ is an upper side Dv, and $\alpha$ is the most probable acceleration of the vehicle obtained with the vehicle accelerometer which will be described later in detail. If $Vm_i$ is within the specified variance Dv from the previously obtained intermediate reference velocity $Vi_{i-1}$, $Vm_i$ is defined as intermediate reference velocity Vi; if $Vm_i$ is not within the specified variance Dv, but smaller than the minimum variance limit $Vi_{i-1}+Dv_1$, the minimum variance limit $Vi_{i-1}+Dv_1$ is defined as intermediate reference velocity Vi; and if $Vm_i$ is not within the specified variance Dv, but greater than the maximum variance limit $Vi_{i-1}+Dv_2$, the maximum variance limit $Vi_{i-1}+Dv$ is defined as intermediate reference velocity Vi. (Dv takes a negative value for deceleration.)

Figure 2:
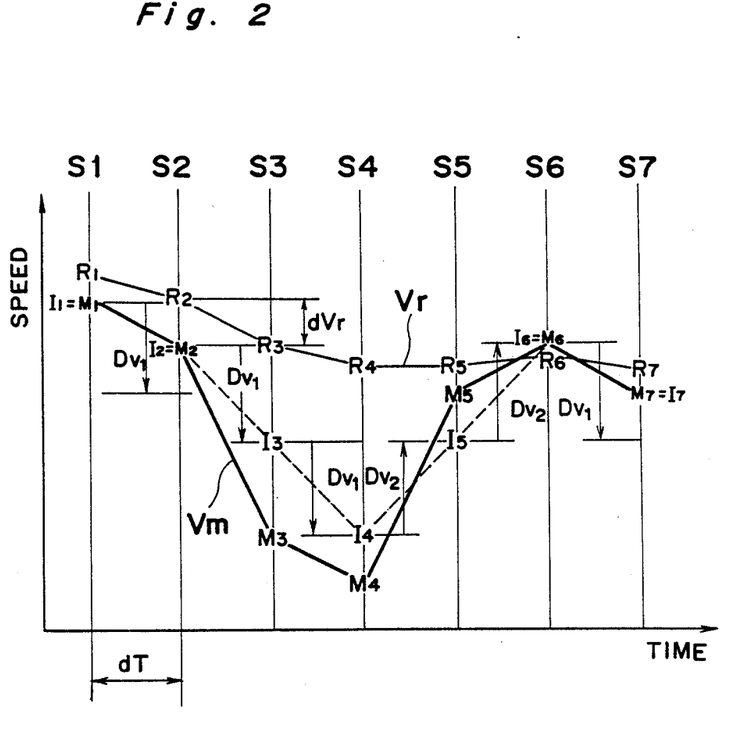
FIG. 2 is a graph showing sampling signals obtained from the major components illustrated in the block diagram of FIG. 1.

For example, in the graph of FIG. 2, at the sampling point S3, when the difference between the newly obtained selected wheel velocity $Vm_i$ at plotted point M3 and the previously obtained intermediate reference velocity I2 (in FIG. 2, this is equal to the previously obtained selected wheel velocity $Vm_{i-1}$ at plotted point M2) is greater than a predetermined limit of variance $Dv_1$, the plotted point I3 which is the point varied from I2 by the maximum limit of the variance $Dv_1$, instead of the selected wheel velocity $Vm_i$ at plotted point M3, is selected as the intermediate reference velocity for the sampling point S3.

Then, at the next sampling point S4, the difference between the selected wheel velocity at M4 and the previously obtained intermediate reference velocity I3 is compared with the predetermined variance $Dv_1$. Since the difference is greater than the variance $Dv_1$, the maximum limit of the variance $Dv_1$ which is plotted at I4 is selected as the intermediate reference velocity for the sampling point S4. Similarly, at sampling point S5, the point varied from I4 by the maximum limit of the variance $Dv_2$ which is plotted at I5 is selected as the intermediate reference velocity.

Then, at sampling point S6, since the difference between the selected wheel velocity at M6 and the previously obtained intermediate reference velocity I5 is equal to the variance $Dv_2$, the selected wheel velocity at M6 is selected as the intermediate reference velocity at sampling point S6.

Then, at sampling point S7, since the difference between the selected wheel velocity at M7 and the previously obtained intermediate reference velocity I6 is smaller than the variance $Dv_1$, the selected wheel velocity at M7 is selected as the intermediate reference velocity at sampling point S7.

In this manner, for the intermediate reference velocity of the present sampling point, the presently sampled selected wheel velocity is used if the presently sampled selected wheel velocity falls within the specified variance Dv from the previously calculated intermediate reference velocity. On the other hand, the maximum limit of the variance Dv from the previously calculated intermediate reference velocity is used if the presently sampled selected wheel velocity does not fall within the specified variance Dv from the previously calculated intermediate reference velocity.

The reasons for setting the intermediate reference velocity Vi as described above are as follows. When the wheels are going to lock, the wheel velocity becomes lower than vehicle velocity. If all the wheels are going to lock, even the selected wheel velocity becomes lower than vehicle velocity, too. Therefore, when the velocity of the wheels quickly decreases such that the change in the wheel velocity per a unit time is greater than Dv, the wheels are assumed to be going to lock.

Thus, and the reference wheel velocity to represent vehicle velocity is determined not to exceed the maximum possible deceleration rate as known from experience, specifically the lower limit of variance $Dv_1$, irrespective of the measured wheel velocity.

Variance $Dv_2$ is also set so that intermediate reference velocity Vi does not depart from selected wheel velocity Vm when driving on poor roads even if selected wheel velocity Vm fluctuates wildly up and down and exceeds the limits established by variance Dv.

Reference number 4 is a variance Dv controller which sets variances $Dv_1$, $Dv_2$ as required to calculate intermediate reference velocity Vi. Variance Dv may be set as a specified constant, but i a preferred embodiment as shown in FIG. 1 it is desirable to enable variance Dv to vary according to acceleration signal $\alpha$ ($\alpha$ expresses acceleration when positive and deceleration when negative) output by a vehicle accelerometer which detects vehicle acceleration and deceleration. It is to be noted that vehicle accelerometer 12 may be of various types ranging from a low resolution type which only outputs two values (for example, large deceleration as one value and small deceleration including an acceleration as another value) to high resolution types the output of which varies in an analog manner within the measurement range. However, even high precision accelerometers require some form of compensation because vehicle deceleration is affected by the slope of the road, variations in installation, the load distribution of the wheel, changes in the suspension springs with time, and other factors. It is also necessary to consider what to do when the accelerometer fails.

Therefore, variance $Dv_1$ is defined as the maximum deceleration possible in the circumstances at that moment in the present invention. When there is a vehicle accelerometer, variance $Dv_1$ is defined according to the accelerometer output as the maximum deceleration possible at a specific output. If there is no accelerometer or if a failure is detected, variance $Dv_1$ may be set according to the maximum deceleration which may occur with the vehicle under normal conditions for all possible road surfaces. The upper side variance $Dv_2$ can be given from equation (1') by the following equation:

$$Dv_2 = 2 * \alpha dT - Dv_1.$$

Furthermore, a signal $\alpha$ from vehicle accelerometer 12 is also sent to antilock control circuit 11 where it is determined whether signal $\alpha$ is normal or abnormal, and the result is given by a result signal E. This determination is accomplished by, for example, comparing signal $\alpha$ with estimated vehicle acceleration signal Ar which is output from estimated vehicle acceleration controller 9, which will be described later. The result signal E is sent to variance Dv controller 4. If the result is an abnormal determination, variance Dv controller 4 ignores acceleration signal $\alpha$ and outputs a predetermined value, specifically the value which would be set when there is no vehicle accelerometer 12, as variance Dv.

Reference number 5 is a quasi-reference wheel velocity controller which compares intermediate reference velocity Vi and selected wheel velocity Vm, selects the larger of the two values, and outputs the larger one as a quasi-reference wheel velocity Vt. Therefore, quasi-reference wheel velocity Vt corresponds to the line plotted through points M1, M2, I3, I4, M5, M6, M7 in FIG. 2. Furthermore, selection signal SL which indicates which velocity is selected is sent from quasi-reference wheel velocity controller 5 to index A controller 7 described below.

Reference number 6 is a variance computer which obtains variance dVr per each one sampling cycle period dT of reference wheel velocity Vr. Variance dVr is calculated with the following equation:

$$dVr_i = A(Vt_i - Vr_{i-1}) \quad (2)$$

wherein specifically, variance $dVr_i$ is equal to the product of A the difference between reference wheel velocity $Vr_{i-1}$ computed from the previous sampling cycle (obtained from reference wheel velocity computer 8 described below) subtracted and quasi-reference wheel velocity $Vt_i$ obtained from the current sampling cycle where A is a specified index (A=0 to 1.0).

When no vehicle acceleration measuring device is provided on the vehicle or when the provided device is out of order, $\alpha$ is assumed as 0 and, therefore, $Dv_2 = -Dv_1$, is obtained. Here, since $Dv_1$ takes a negative value, $Dv_2$ in this situation takes a positive value. In the case where the vehicle acceleration measuring device has a high resolving power and high reliability, it is possible to set $Dv_1$ to have a small difference from $\alpha * dT$. In such a case, depending on the value of $\alpha$, there may be a case when $Dv_2$ takes a negative value.

Index A is set by index A controller 7, and may vary according to various elements described later.

Reference number 8 is a reference wheel velocity computer which computes reference wheel velocity Vr. Reference wheel velocity Vr is obtained with the following equation:

$$Vr_i = Vr_{i-1} + dVr_i \quad (3)$$

wherein reference wheel velocity $Vr_i$ is equal to the sum of reference wheel velocity $Vr_{i-1}$ computed at the previous sampling cycle and variance $dVr_i$ computed from the current sampling cycle. From equations (2) and (3):

$$Vr_i = Vr_{i-1} + A(Vt_i - Vr_{i-1}),$$

is obtained, which indicates that $Vr_i$ is equal to the exponentially filtered value of $Vt_i$.

In FIG. 2, reference wheel velocity Vr is plotted on the line through points R1, R2 ... Rn. As will be known from the graph, the line of points R1, R2 Rn is a smoothed version of line M1, M2 ... Mn which is based on the actual wheel speed. For example, even if the wheels tend to lock when the brakes are suddenly applied (for example, the change from M2 to M3), reference wheel velocity Vr is output as a value near the actual vehicle speed. Specifically, reference wheel velocity Vr is designed to be a value which approximately tracks the upper envelope of the selected wheel velocity.

Reference number 9 is an estimated vehicle acceleration controller which calculates estimated vehicle acceleration Ar based on the wheel speed. Estimated vehicle acceleration Ar is obtained with the following equation:

$$Ar_i = Ar_{i-1} + B(dVr_i/dT - Ar_{i-1}) \quad (4)$$

wherein estimated vehicle acceleration $Ar_i$ is equal to the sum of $Ar_{i-1}$ computed during the current sampling cycle and the product of specified index B (B=0 to 1.0) multiplied by the difference of the quotient of variance $dVr_i$ computed at the current sampling cycle divided by sampling cycle period dT minus estimated vehicle acceleration $Ar_{i-1}$ computed from the previous sampling cycle. Specifically, $Ar_i$ is equal to the exponentially filtered value of the rate of change of $Vr_i$ over time Index B is set by index controller 10.

In the preferred embodiment, index B may be a constant value, but it is desirable that index B be a standard value (for example, 1/16) when antilock control is applied, and be a value greater than the standard value (for example, ¼) when said same control is not applied.

Thus, discrimination signal ALC, which indicates whether or not antilock control is being applied, is applied to index B controller 1( from antilock control circuit 11. It is to be noted that said discrimination signal ALC is also applied to wheel velocity selector 2 and to index A controller 7.

Indices A and B are both serving as the filtering attenuation factor of the exponential filtering method. When the indices approach 1.0, Vr tracks Vt and Ar tracks (dVr/dT) with quick response, and when the indices approach 0, tracking occurs with slower response.

Index A controller 7 is hereinbelow described. Index A controller 7 has input terminals T1, T2, T3, T4, T5, T6, to which are respectively applied quasi-reference wheel velocity Vt, selection signal SL, selected wheel velocity Vm, reference wheel velocity Vr, antilock control discrimination signal ALC, and estimated vehicle acceleration signal Ar.

Based on the aforementioned input data, index A controller 7 analyzes the behavior of selected wheel velocity Vm, and sets index A for different situations.

Figure 3:
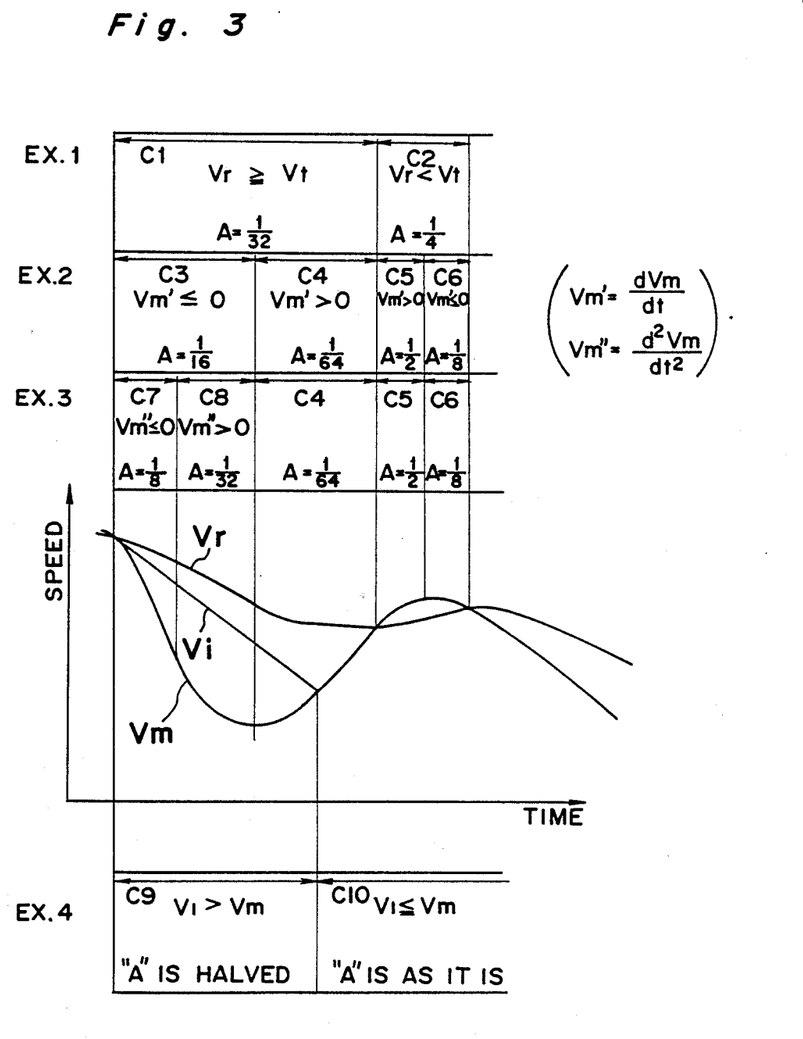
FIG. 3 is a chart showing examples for setting index A by the index A controller shown in FIG. 1.

Five possible settings for index A (examples 1 through 5) are hereinbelow described with reference to FIG. 3. With respect to the following description, it is assumed that said data Vm, Vt, and Vr shown in the graph of FIG. 3 are output from devices 2, 3, and 8, respectively.

EXAMPLE 1

In this example, reference wheel velocity Vr and quasi-reference wheel velocity Vt are compared in index A controller 7. If Vr is greater than or equal to Vt, i.e., in the case of situation C1, A is defined as a low value (e.g., A=1/32), but if Vr is less than Vt, i.e., situation C2, A is defined as a high value (e.g., A=¼). In this example, a comparator is required in index A controller 7, and Vr and Vt are the only required input signals.

EXAMPLE 2

In this example, the comparison described in Example 1 is performed, and it is also determined whether the first differential Vm' of selected wheel velocity Vm is positive or negative. If Vm' is negative or zero and Vr is greater than or equal to Vt (Vr≧Vt), situation C3, A is defined as a high value (e.g., A=1/16). If Vm' is positive and Vr is greater than or equal to Vt (Vr≧Vt), i.e., situation C4, A is defined as a low value (e.g., A=1/64). If Vm' is positive and Vr is less than Vt (Vr<Vt), i.e., situation C5, A is defined as a high value (e.g., A=½). If Vm' is negative or zero and Vr is less than Vt (Vr<Vt), i.e., situation C6, A is defined as a low value (e.g., A=⅛). In this example, a comparator and first differentiating circuit are required in index A controller 7, and Vr and Vt are the required input signals.

EXAMPLE 3

In this example, the comparison and differentiation described in Example 2 are performed, and it is also determined whether the second differential Vm'' of selected wheel velocity Vm is positive or negative when Vr is greater than or equal to Vt and Vm' is less than or equal to zero (Vr≦Vt and Vm'≧0). If this condition is fulfilled, i.e., situation C3, and if Vm'' is negative or zero, i.e., situation C7, A is defined as a high value (e.g., A=⅛). If situation C3 is satisfied and Vm'' is positive, i.e., situation C8, A takes an intermediate value (e.g., A=1/32). In this example, a comparator, a first differentiating circuit, and a second differentiating circuit are required in index A controller 7, and Vr and Vt are the required input signals.

In Example 3, it is desirable to define the value of A in situation C5 as greater than the average of A in situations C7 and C8, and the value of A in situation C6 as greater than the value of A in situation C4.

EXAMPLE 4

In this example, in addition to the processing described in any one of Examples 1 to 3 above, intermediate reference velocity Vi and selected wheel velocity Vm are compared in index A controller 7. When Vi is greater than Vm (Vi>Vm) as shown in situation C9, i.e., when Vt=Vi, the value of A is set one degree smaller than the value of A when Vi is less than or equal to Vm (Vi≦<Vm), i.e., when Vt=Vm, as shown in situation C10. It is possible to revise such that the value of A in situations C9 and C10 may, for example, be equal to and twice, respectively, the value of A obtained in Examples 1 to 3. Furthermore, in an alternative method, said value of A may be halved in situation C9 and equal to A in Examples 1 to 3 in situation C10.

EXAMPLE 5

In this example, the processing described in any one of Examples 1 to 4 above is performed, and the obtained value A is corrected to be proportionally increased or decreased depending upon the value of estimated vehicle acceleration Ar. This is because, when Vt is changing constant acceleration Ar, Vr is estimated larger than Vt with the difference proportional to:

$$-Ar(A^1-1),$$

and when A is sufficiently low, the difference is approximately proportional to $$-A^{Ar}.$$

Because it is desirable to keep the difference between Vr and Vt nearly constant irrespective of Ar, the calculated index A is desirably corrected by the amount of Ar.

If the correction is given by Å, the required correction may be expressed as:

$$\text{Å}=(-m \cdot Ar+n) \cdot A \tag{5}$$

where m and n are constants.

In any one of Examples 1 to 5 above, the value of A may be varied depending on whether antilock control is applied. This is to quickly obtain estimated vehicle acceleration Ar when antilock control begins. Thus, discrimination signal ALC identifying whether antilock control is applied to index A controller 7.

It is to be noted that acceleration signal α, which is based on the measured signal obtained from vehicle accelerometer 12, may be substituted for estimated vehicle acceleration Ar.

By thus selecting the values of index A and index B, Vr may be appropriately delayed and smoothed, and Vr may thus be obtained as a value close to the actual vehicle speed. Furthermore, by varying A according to the behavior of Vm, a Vr value approaching the upper envelope of Vi can be maintained.

Figure 4:
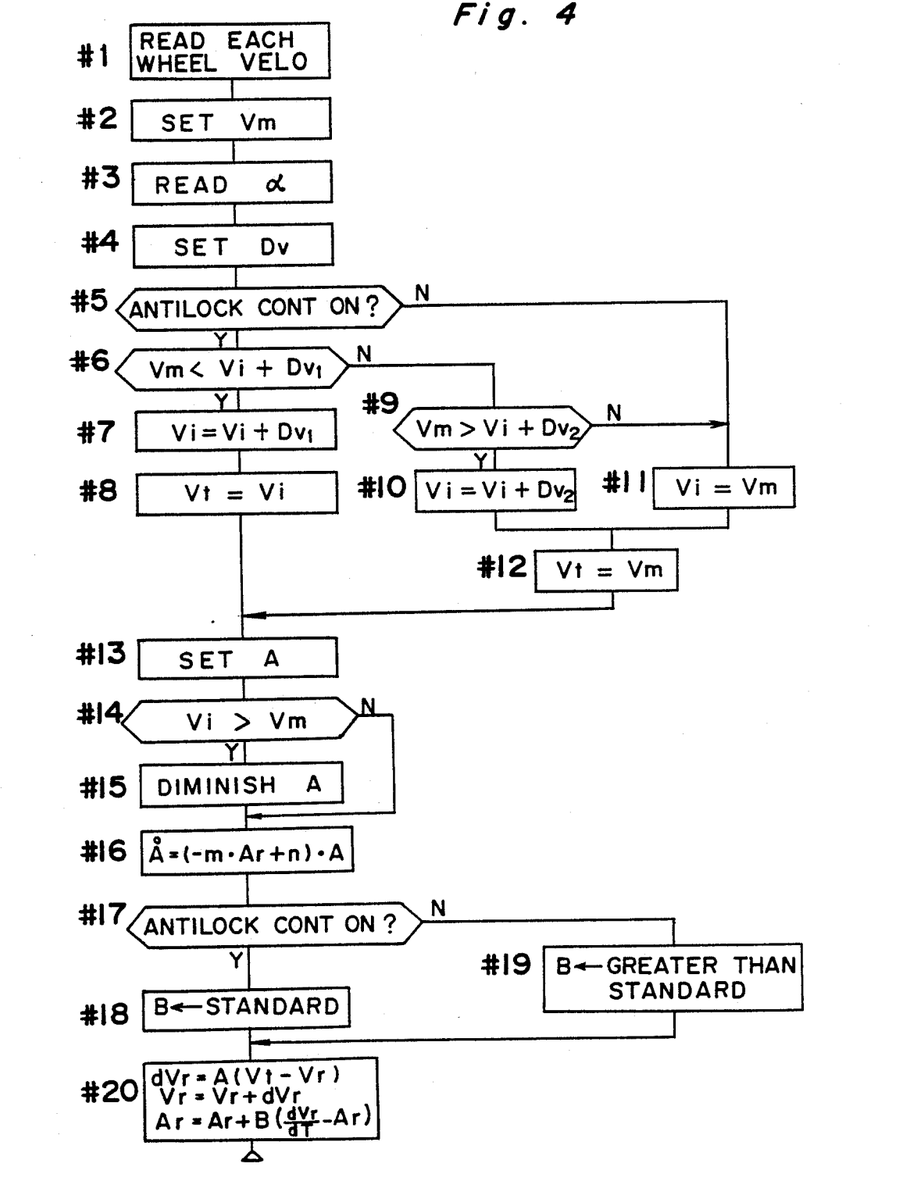
FIG. 4 is a flow chart showing the operation of the device shown in FIG. 1.

The operation of a reference wheel velocity calculation apparatus according to the present invention is hereinbelow described with reference to FIG. 4.

First, the velocity of each wheel is read (step #1), and selected wheel velocity Vm is determined (step #2). On a two-wheel drive vehicle, it is desirable that the method of choosing the selected wheel velocity differs according to whether antilock control is applied. For example, if antilock control is applied, the greatest of the four wheel velocities is selected, and if antilock control is not applied, the fastest of the non-driven wheels is selected. On a four-wheel drive vehicle, more sophisticated selection would be desirable.

Vehicle acceleration signal α is next read (step #3), and variance Dv is determined (step #4). It is then checked whether antilock control is applied (step #5), and if so, it is judged whether selected wheel velocity Vm obtained in the current sampling cycle is within the range of variance from the intermediate reference velocity Vi obtained at the previous sampling cycle.

If Vm is within said range, (steps #6, #9, #11), intermediate reference velocity Vi is defined as selected wheel velocity Vm obtained in the current sampling cycle (step #11).

If Vm is smaller than said range (steps #6, #7), intermediate reference velocity Vi obtained in the current sampling cycle is defined as the value of intermediate reference velocity Vi obtained at the previous sampling cycle plus variance $Dv_1$ ($Dv_1$ is a negative value) (step #7).

If Vm is greater than said range (steps #6, #9, #10), intermediate reference velocity Vi obtained in the current sampling cycle is defined as the value of intermediate reference velocity Vi obtained at the previous sampling cycle plus variance $Dv_2$ ($Dv_2$ can be a negative or positive value) (step #10).

Furthermore, if antilock control is not applied step #5), intermediate reference velocity Vi is defined as selected wheel velocity vm obtained in the current sampling cycle (step #11).

In the event of step 7, intermediate reference velocity Vi is defined as quasi-reference wheel velocity Vt (step #8), and in the event of step #10 or #11, selected wheel velocity Vm is defined as quasi-reference wheel velocity Vt (step #12).

Next, index A is defined (step #13) based on any of Examples 1 to 5 or a combination thereof, and Vi and Vm are thereafter compared (step #14).

If intermediate reference velocity Vi is greater, index A may, for example, be decreased by half (step #15), and then corrected by using equation (5) previously described (step #16). If intermediate reference velocity Vi is lower, index A is directly corrected by using said equation (5) (step #16).

It is then checked whether antilock control is applied (step #17). If yes, index B is defined as the standard value (step #18), and if not, index B is defined as a value greater than the standard value (step #19).

Finally, reference wheel velocity Vr, variance dVr, and estimated vehicle acceleration Ar are computed using indices A and B and Vt (step #20).

It is to be noted that the computation in step #20 is performed using aforementioned equations (2), (3), and (4), but similar equations may also be used. For example, the equation:

$$Vr_i = Vr_{i-1} + Ar_i \cdot dT \qquad (3')$$

may be substituted for equation (3). It is noted that, instead of equation (3), any equation may be used as long as Vr tracks Vt at any desired tracking rate.

A first feature of the present invention is such that the deceleration of reference wheel velocity Vr is not changed directly, but i directly through the tracking rate to follow quasi-reference velocity Vt. Vr can thus track smoothly and more closely to the upper envelope of Vm. If the Vr curve is smooth, it is easier to use the differential of the deviation when the deviation between the velocity of each wheel and Vr, i.e. slip, is the control object, and the control algorithm is thus simplified.

A second feature of the present invention is such that Vr tracks not Vm but Vt, the maximum variance of which is suppressed within a predetermined limit, which in turn is variable according to the measured value of vehicle deceleration. When the vehicle decelerometer shows a certain value, the lower limit of variance is set as the maximum possible vehicle deceleration (minimum when the acceleration is shown) which can ha)pen under that measured deceleration value. Thus, uniform processing is possible whether or not a vehicle decelerometer is used and with any type of detector, from high resolution sensors to low resolution switches, and it is possible to compensate for the effects of installation precision, road surface slope, and equipment failure.

A third feature of the present invention is that the Vt tracking rate is varied not only according to the behavior of Vm, but also according to estimated vehicle acceleration Ar. Thus, the delay between Vr and Vt, that is, the deviation between Vm and Vr when Vm is under an approximately constant deceleration, can be set approximately constant irrespective of the deceleration, and an ideal reference wheel velocity used to compute slip and the slip rate can be obtained.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reference wheel velocity (Vr) calculation apparatus for use in an automotive vehicle comprising:
   means for sampling actual wheel velocities of each wheel detected at a predetermined sampling cycle;
   means for selecting one of the sampled actual wheel velocities as a selected wheel velocity (Vm);
   means for calculating an intermediate reference velocity (Vi) from the selected wheel velocity (Vm) by suppressing a variance between a current intermediate reference velocity (Vi) and a previous intermediate reference velocity ($Vi_{l-1}$) to be within a predetermined limit(s) (Dv);

means for setting a quasi-reference wheel velocity (Vt) which is the greater one of the presently sampled selected wheel velocity (Vm) and the calculated intermediate reference velocity (V2);

means for setting an index (A) in response to the selected wheel velocity (Vm); and means for computing the reference wheel velocity (Vr) by smoothing the quasi-reference wheel velocity (Vt) according to index (A).

2. A reference wheel velocity (Vr) calculation apparatus as claimed in claim 1, further comprising means for obtaining an acceleration of the vehicle and, wherein said predetermined limit(s) of variance (Dv) is varied based on the obtained vehicle acceleration.

3. A reference wheel velocity (Vr) calculation apparatus as claimed in claim 1, wherein said predetermined limit(s) of variance (Dv) is set for each of lower end ($Dv_1$) and upper end ($Dv_2$), and said lower limit of variance ($Dv_1$) is equal to the maximum possible deceleration for the vehicle at that moment.

4. A reference wheel velocity (Vr) calculation apparatus as claimed in claim 1, wherein said computing means computes the reference wheel velocity (Vr) by the following equation:

$$Vr_i = Vr_{i-1} + A(Vt_i - Vr_{i-1})$$

$$0 < A < 1.0$$

wherein $Vr_i$ and $Vr_{i-1}$ are reference wheel velocity obtained in the present and previous cycles, respectively, $Vt_i$ is the quasi-reference wheel velocity obtained in the present cycle and A is the index set by setting means.

5. A reference wheel velocity (Vr) calculation apparatus as claimed in claim 4, wherein a value of said index A is set higher when the difference between said reference wheel velocity (Vr) and said selected wheel velocity (Vm) is on an increasing trend, and is set lower when said difference is on a decreasing trend.

6. A reference wheel velocity (Vr) calculation apparatus as claimed in claim 4, wherein a value of said index A is set lower when said reference wheel velocity (Vr) is greater than said quasi-reference wheel velocity (Vt), and is set higher when said reference wheel velocity (Vr) is lower than said quasi-reference wheel velocity (Vt).

7. A reference wheel velocity (Vr) calculation apparatus as claimed in claim 4, further comprising means for obtaining an acceleration of the vehicle and, wherein a value of said index A is set variably according to vehicle acceleration.

8. A reference wheel velocity (Vr) calculation apparatus as claimed in claim 7, wherein said vehicle acceleration (Ar) is calculated from the following equation:

$$Ar_i = Ar_{i-1} + B(_{dT}{}^{dVr} - Ar_{i-1})$$

$$0 < B < 1.0$$

9. A reference wheel velocity (Vr) calculation apparatus as claimed in claim 8, wherein said reference wheel velocity (Vr) is used for an antilock brake control system, and wherein a value of said index B is set higher during non-antilock braking than during antilock braking.

10. A reference wheel velocity (Vr) calculation apparatus for use in an automotive vehicle comprising:

means for sampling an actual wheel velocity (Vm) detected at a predetermined sampling cycle;

means for calculating an intermediate reference velocity ($Vi_l$) of a present sampling point, a presently sampled actual wheel velocity ($Vm_l$) being used if the presently sampled actual wheel velocity ($Vm_l$) falls within an allowable band ($Vi_{l-1} \pm Dv$), and a limit value ($Vi_{l-1} + D$ or $Vi_{l-1} - Dv$) of said band being used if the presently sampled actual wheel velocity ($Vm_l$) falls beyond said band ($Vi_{l-1} \pm Dv$), wherein ($Vi_{l-1}$) is an intermediate reference velocity calculated in the previous sampling cycle and $\pm Dv$ is a maximum and minimum allowable limit of a variance of Vi;

means for setting a quasi-reference wheel velocity (Vt) which is a greater one of the presently sampled actual wheel velocity (Vm) and a calculated intermediate reference velocity (Vi);

means for setting an index (A) based on the actual wheel velocity (Vm); and means for computing the reference wheel velocity (Vr) by smoothing the reference wheel velocity (Vt) according to the index (A).

11. A reference wheel velocity (Vr) calculation apparatus as claimed in claim 10, wherein said actual wheel velocity (Vm) sampling means comprises:

means for obtaining actual wheel velocities of a plurality of wheels of said automotive vehicle; and means for selecting one actual wheel velocity (Vm) from the plurality of actual wheel velocities.

12. A reference wheel velocity (Vr) calculation apparatus as claimed in claim 11, wherein said actual wheel velocity obtaining means obtains actual wheel velocities of all the wheels.

13. A reference wheel velocity (Vr) calculation apparatus as claimed in claim 11, wherein said selecting means selects the greatest one of the plurality of actual wheel velocities.

14. A reference wheel velocity (Vr) calculation apparatus as claimed in claim 10, further comprising means for obtained an acceleration/deceleration of the vehicle, said variance ($\pm Dv$) being varied based on the obtained vehicle acceleration/deceleration.

15. A reference wheel velocity (Vr) calculation apparatus as claimed in claim 10, wherein said variance ($\pm Dv$) is equal to the maximum possible acceleration/deceleration for the vehicle.

16. A reference wheel velocity (Vr) calculation apparatus as claimed in claim 10, wherein said computing means computes the reference wheel velocity (Vr) by the following equation:

$$Vr_l = Vr_{l-1} + A(Vt_l - Vr_{l-1})$$

$$0 < A < 1.0$$

wherein $Vr_l$ and $Vr_{l-1}$ are reference wheel velocity obtained in the present and previous cycles, respectively, $Vt_l$ is the reference wheel velocity obtained in the present cycle and A is the index set by setting means.

17. A reference wheel velocity (Vr) calculation apparatus as claimed in claim 16, wherein a value of said index A is set high when a deviation between said reference wheel velocity (Vr) and said actual wheel velocity (Vm) is on an increasing trend, and is set low when said deviation is on a decreasing trend.

18. A reference wheel velocity (Vr) calculation apparatus as claimed in claim 16, wherein a value of said index A is set low when said reference wheel velocity (Vr) is greater than said reference wheel velocity (Vt), and is set high when said reference wheel velocity (Vr) is lower than said reference wheel velocity (Vt).

19. A reference wheel velocity (Vr) calculation apparatus as claimed in claim 16, further comprising means for obtaining an acceleration/deceleration of the vehicle and, wherein a value of said index A is set variably according to vehicle acceleration/deceleration.

20. A reference wheel velocity (Vr) calculation apparatus as claimed in claim 19, wherein said vehicle acceleration/deceleration (Ar) is calculated from the following equation:

$$Ar_I = Ar_{I-1} + B(_{dT}{}^{dVr} - Ar_{I-1})$$

$$0 < B < 0.1.$$

21. A reference wheel velocity (Vr) calculation apparatus as claimed in claim 19, wherein said reference wheel velocity (Vr) is used for an antilock brake control system, and wherein a value of said index B is set higher during non-antilock braking than during antilock braking.

* * * * *